(12) United States Patent
Wells et al.

(10) Patent No.: US 9,804,886 B1
(45) Date of Patent: Oct. 31, 2017

(54) EXTENDING OBJECT-SCHEMA-BASED APPLICATION PROGRAMMING INTERFACES (APIS)

(71) Applicant: INTUIT INC., Mountain View, CA (US)

(72) Inventors: Joe Wells, Mountain View, CA (US); Greg Lauckhart, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/167,859

(22) Filed: May 27, 2016

(51) Int. Cl.
   G06F 9/46 (2006.01)
   H04L 29/08 (2006.01)

(52) U.S. Cl.
   CPC .............. G06F 9/465 (2013.01); H04L 67/02 (2013.01)

(58) Field of Classification Search
   CPC ....................................... G06F 9/465
   See application file for complete search history.

(56) References Cited

U.S. PATENT DOCUMENTS

| | | | | |
|---|---|---|---|---|
| 8,756,617 B1 * | 6/2014 | Boodman | ............... | G06F 21/53 719/328 |
| 9,424,112 B1 * | 8/2016 | Malamut | .................. | G06F 9/547 |
| 9,667,704 B1 * | 5/2017 | Sonawane | ............... | H04L 67/10 |
| 2003/0135503 A1 | 7/2003 | Goldberg et al. | | |
| 2004/0098384 A1 * | 5/2004 | Min | .................. | G06F 17/30911 |
| 2014/0172914 A1 | 6/2014 | Elnikety et al. | | |
| 2015/0331675 A1 | 11/2015 | De Magalhaes | | |
| 2016/0077897 A1 * | 3/2016 | Tsang | .................. | G06F 9/45529 719/328 |

FOREIGN PATENT DOCUMENTS

WO     2015147656 A2    10/2015

OTHER PUBLICATIONS

Antonio Garrote et al., "RESTful writable APIs for the web of Linked Data using relational storage solutions", Apr. 29, 2011 XP055377451, http://events.linkeddata.org/ldow2011/papers/ldow2011-paper04-garrote.pdf [retrieved on May 31, 2017], whole document, 9 pages.
Brandur Leach, "Elegant APIs with JSON Schema," XP055391508, https://brandur.org/elegant-apis, May 27, 2014, [retrieved on Jul. 17, 2017] the whole document, 5 pages.
Anonymous: "rest—Should a RESTful API have a schema?—Stack Overflow", dated Jan. 3, 2016 (Jan. 13, 2016), XP055391509, https://stackoverflow.com/questions/34735343/should-a-restful-api-have-a-schema, [retrieved on Jul. 17, 2017] the whole document, 2 pages.
PCT/US2017/028505, International Search Report dated Jul. 24, 2017, 16 pages.

* cited by examiner

*Primary Examiner* — Timothy A Mudrick
*Assistant Examiner* — Abdou Seye
(74) *Attorney, Agent, or Firm* — Patterson + Sheridan, LLP

(57) ABSTRACT

The present disclosure relates to extending object-schema-based application programming interfaces (APIs). According to one embodiment, a method generally includes receiving, from a user, a schema defining an extension to the API and a reference to a parent node in a graph projection of the API. An API system updates the graph projection of the API to include a node representing the extension and navigable path to the node representing the extension. The API system processes a request from the user by traversing through the updated graph projection of the API, the request representing the navigable path to the node representing the extension.

16 Claims, 10 Drawing Sheets

```
scope: "public"
lifecycle: "R2"
provider:
    service: fabric
    read: true description: "Employee data"
properties:
    id:
        type: string
        format: "ID"
        description: "Company-specific
identifier for an employee"
    hireDate:
        type: string
        format: date
        description: "Date employment started"
    releaseDate:
        type: string
        format: date
        description: "Date employment
terminated"
    contractDetails:
        type: array
        items: $ref: /payroll/employee/
EmployeeContractDetails
        description: "Contractual information
about an employee

```
query q{
    companies (id: "1") {
        employees (id: "123") {
            contractDetails
        }
    }
}
```

EXTENDING OBJECT-SCHEMA-BASED APPLICATION PROGRAMMING INTERFACES (APIS)

BACKGROUND

Field

Embodiments presented herein generally relate to defining application programming interfaces (APIs) using object schemas, and more specifically to extending object-schema-based APIs.

Description of the Related Art

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call). A RESTful call generally uses HTTP requests to invoke a function exposed by a web-based API and provide data to the invoked function for processing. In other cases, web-based applications can invoke API functions using queries encapsulated in an HTTP POST request, a Simple Object Access Protocol (SOAP) request, or other protocols that allow client software to invoke functions on a remote system.

Application developers often develop extensions to an existing API to add new functionality to an API. When developers introduce new extensions to an existing API, developers may add additional API functions to the target API. Over time, the number of functions in an extended API may grow significantly. However, these functions may duplicate large amounts of code, which may increase the amount of work required to maintain and update the API.

SUMMARY

One embodiment of the present disclosure includes a method for extending an object-schema-based application programming interface (API). The method generally includes receiving, from a user, a schema defining an extension to the API and a reference to a parent node in a graph projection of the API. An API system updates the graph projection of the API to include a node representing the extension and navigable path to the node representing the extension. The API system processes a request from the user by traversing through the updated graph projection of the API, the request representing the navigable path to the node representing the extension.

Another embodiment provides a computer-readable storage medium having instructions, which, when executed on a processor, performs an operation for extending an object-schema-based application programming interface (API). The operation generally includes receiving, from a user, a schema defining an extension to the API and a reference to a parent node in a graph projection of the API. An API system updates the graph projection of the API to include a node representing the extension and navigable path to the node representing the extension. The API system processes a request from the user by traversing through the updated graph projection of the API, the request representing the navigable path to the node representing the extension.

Still another embodiment of the present invention includes a processor and a memory storing a program, which, when executed on the processor, performs an operation for extending an object-schema-based application programming interface (API). The operation generally includes receiving, from a user, a schema defining an extension to the API and a reference to a parent node in a graph projection of the API. An API system updates the graph projection of the API to include a node representing the extension and navigable path to the node representing the extension. The API system processes a request from the user by traversing through the updated graph projection of the API, the request representing the navigable path to the node representing the extension.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 3 illustrates an example schema definition for a node in a graph-based API, according to one embodiment.

DETAILED DESCRIPTION

Figure 1:
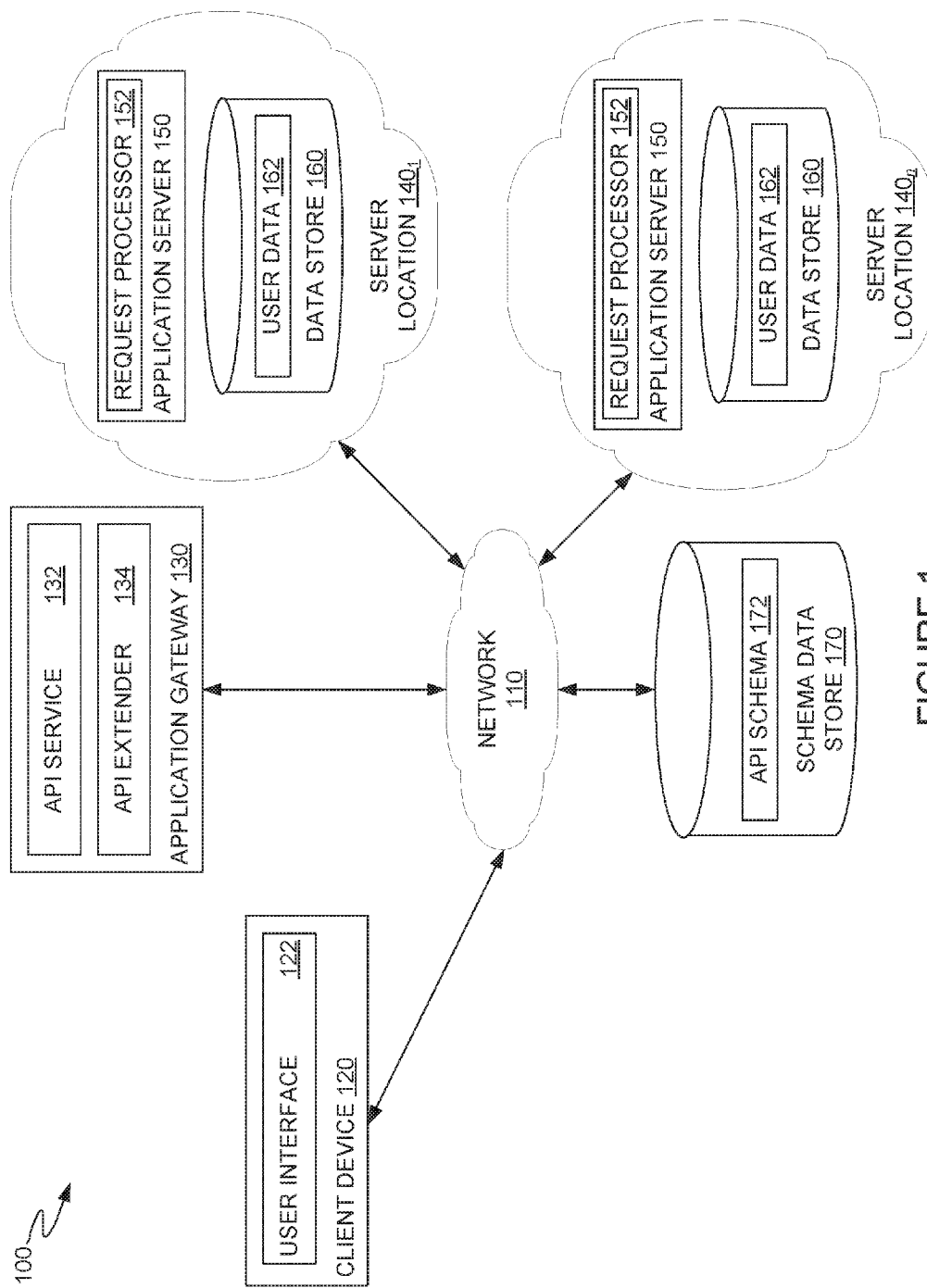
FIG. 1 illustrates an example computing environment, according to one embodiment.

Application programming interfaces (APIs) generally expose methods and procedures that software developers can use to build software applications using features provided by a software system. These features may include, for example, database interaction, data processing, and so on. Over time, additional features may be introduced into the API to address data and processing requirements for various use cases. To introduce new features into the API, a developer can, for example, add additional functions which may have a distinct name or overload an existing function (i.e., have the same name as an existing function but use different input parameters).

Embodiments presented herein provide techniques for generating API function calls by traversing a graph representation of an API. Generally, a graph representation of an API includes a root node and a plurality of child nodes, with each child node representing a function exposed by the API (e.g., to request or write data to a data store, analyze data in a data store, and so on). The graph may be generated using a group of schema definition files. Each schema definition file can define one or more nodes (functions) and include, for example, information defining the data provided by a node, required and optional parameters for functions supported by a node, and relationships between nodes (e.g., parent/child nodes). The graph representation of the API can define, for example, the access path for any function defined by the API as a navigable path through the graph. By projecting a graph representation of an API based on the schema definitions files, a computing system can provide a navigable path (e.g., from the root node to a child node representing the function that a user wishes to invoke) that enables software developers to program customizable interactions with a system without building custom APIs to support specific functions (or variations on a function).

In building web services, developers can define schemas for the format and content of a result generated by a specific API function. Each API function may be defined, for example, as a RESTful path. Individual RESTful paths to specific API functions are generally created manually (defined and coded) to define each function supported by the API. As developers wish to add functionality to an API, developers generally add a new RESTful path to the API and generate code to provide the desired functionality to the API.

According to embodiments presented herein, a server that exposes an API to multiple client devices can use a graph structure to represent functions supported by the API. When a server receives a request from a client system to interact with the API (e.g., as a RESTful path, a serialized data string, and so on), the server can decompose the request to identify the nodes in the graph accessed by the request and an order in which the nodes are to be accessed. To decompose the request into a set of subqueries, the server can parse the request based on a delimiter defined for the request. Based on the identified nodes and the order in which the nodes are accessed, the server can traverse the graph structure to generate queries or other API function calls to satisfy the request.

According to embodiments presented herein, extensions to an object schema-based API may be defined in relation to existing nodes in the graph representation of the API. To add an extension to an object schema-based API, a developer can provide a schema definition identifying one or more parent nodes. Based on the schema definition, a graph representation of the API is generally updated to reflect the existence of one or more navigable paths to the extension. Developers can use the extension by generating a request using one of the one or more navigable paths to the extension. An API service can decompose the request to identify the nodes in the graph representation of the API to interact with, and obtain the requested data from a data source identified in the schema definition for the extension.

FIG. 1 illustrates an example computing environment 100 for projecting a graph representation of an API and processing client requests using the projected graph representation of the API, according to one embodiment of the present disclosure. As illustrated, computing environment includes a client device 120, application gateway 130, a plurality of server locations 140, and a schema data store 170.

As illustrated, client device 120 includes a user interface 122 which allows users to interact with data and services provided by a software system via a graph-based API, as described in further detail below. User interface 122 generally displays graphical user interface (GUI) elements that allow a user to request data from one or more application servers 150 (in server locations 140) via application gateway 130 or directly from a specific application server 150. In an example, user interface 122 may allow a user to select data that the user wishes to view. Based on the selections received in user interface 122, client device 120 can generate and transmit a query to application gateway 130 (or a specific application server 150). Client device 120 may generate the query using a query format supported by application gateway 130 or a specific application server 150. For example, client device 120 may format the query as a RESTful query, a GraphQL query, a custom query language, or in any other format supported by application gateway 130 or a specific application server 150.

Client device 120 generally receives data from application gateway 130 (or a specific application server 150) to display in one or more graphical elements in user interface 122. Client device 120 can subsequently display the data in graphical elements in user interface 122. In some cases, user interface 122 may allow a user to generate additional queries based on data provided by application gateway 130 or a specific application server 150.

Application gateway 130 is generally configured to receive requests for data from a client device 120 (i.e., queries composed in user interface 122), process requests, and provide data to the client device 120. As illustrated, application gateway 130 includes API service 132 and API extender 134.

API service 132 can build a graph projection of the API based on API schema 172 stored at schema data store 170. The graph projection of the API may provide, for example, a structure that allows an API service 132 to interact with the API (e.g., using a request indicating a navigable path through the graph projection of the API). The structure may represent, for example, a protocol binding for a request protocol that allows API service 132 to respond to requests by identifying nodes in the graph projection of the API and the associated data sources to interact with. To build a projection of the API, API service 132 generally examines the schema definitions for each node defined in the API. The schema definition for each node defined in the API generally includes the name of the node, relationships to one or more parent nodes, functions supported by a node, and so on. The projection of the API corresponds to a hierarchy of nodes from the graph with n levels starting from a root node. API service 132 may begin with a single root node in a graph projection of the API, and as API service 132 reads schema definitions for each node, API service 132 can add an identifier representing the node (e.g., the node name) to an appropriate place (level) in the graph. For example, API service 132 may add a first-level node in the graph linked to the root node for a schema definition that identifies a node's parent as the root node. If API service 132 reads a schema definition for a child node with a parent node that is not currently represented in the graph, API service 132 can search API schema 172 for the schema definition of the identified parent node. API schema 172 can add the identified parent node to the appropriate level in the graph and add the child node to the graph at a level below the parent node.

As discussed in further detail below, API schema 172 can define functions in relation to a parent node. The API exposed at application gateway 130 may have a root node, and each request for data interaction (e.g., read, write, data processing requests) using the API may be defined and verified in relation to an access route from the root node. For example, a valid request may be defined as a continuous path through the graph representation of the API, while an invalid request may be defined as a discontinuous path through the graph representation of the API.

API service 132 generally decomposes (or parses) a query against a graph projection of an API to generate one or more subqueries executed on application gateway 130 (or at server locations 140). To decompose (or parse) a query, API service 132 can break a received query into a plurality of parts based on one or more delimiters defined for a format of the query. For example, if the query is received as a REST request, API service 132 can decompose the request in a number of parts, e.g., using the forward slash character as a delimiter. In some cases, API service 132 can parse a request based on tabbing levels, nesting within braces (e.g., a query written using C programming conventions), and so on. Generally, regardless of syntax and the delimiters defined for a specific request syntax, API service 132 generally decomposes the query to identify the portion of the graph projection of the API that serves the query (e.g., identify the navigable path through the graph projection of the API and the one or more data sources to access in executing the query). So long as a request is valid (e.g., a navigable path exists in the graph projection of the API for the request), API service 132 can determine data sources to query to satisfy the request.

After API service 132 parses the received query, API service 132 begins traversing the graph projection of the API to verify that the received query is valid. To traverse the graph projection of the API, API service 132 examines the order in which the decomposed query identifies nodes to visit in the graph projection. The first node identified in the decomposed query generally represents the first node to visit from the root node, which, in a valid query, is an immediate child node of the root node. Subsequent nodes identified in the decomposed query indicate the next node to be visited in the graph representation of the API. For each node identified in the decomposed query, API service 132 can generate a query to obtain specified data from a data source identified in the object schema defining the node. If API service 132 detects that one of the subqueries is not accessible (e.g., the node identified in the subquery is not an immediate child of the node identified in a previous subquery), API service 132 can stop processing the query and notify client device 120 that the received query is invalid.

In some cases, because multiple paths may exist in a graph projection of the API to a specified node, the context in which API service 132 performs a request on the specified node may change based on the navigable path identified in the request. For example, assume that API service 132 receives a request for a list of vendors associated with a specific company. A navigable path for such a request may constitute obtaining data from the "companies" node (e.g., a specific company), and requesting vendors associated with the specific company. In a different request for vendors associated with a specific event hosted by a specific company, the navigable path may include obtaining data from the "companies" node to obtain an identification of a specific company, obtaining data from an "events" node to obtain an identification of a specific event for the identified company, and then obtaining data from the "vendors" node for the identified company and event.

For each subquery, API service 132 can obtain the schema definition for the associated node in the API graph to determine if received query includes any parameters that are required for the subquery to successfully execute. If the schema definition indicates any specific parameters required to execute the subquery, API service 132 can count the number of parameters provided in the request to determine if the required parameters were included in the request. API service 132 can, in some cases, examine the parameters included in the request to determine if the provided parameters match a parameter type (or definition) associated with each parameter in the schema definition for the node. If API service 132 determines that the request did not include the required parameters identified in the schema definition for the node, API service 132 can stop processing the query and notify client device 120 that the received query is invalid. If the request includes the required parameters, API service 132 can fill in the parameters for the subquery from data received in the request based on the format in which API service 132 received the query. For example, as discussed in further detail below, if API service 132 receives the request as a RESTful request (e.g., in an HTTP address format), the parameters for a subquery may be included between an identification of a parent and child node (subquery). In another case, if the request is formatted in a JSON-like (JavaScript Object Notation) format, API service 132 can extract the parameters from, for example, key-value pairs, or two-tuples of {parameter name, value}, included in the request.

After API service 132 generates the one or more subqueries from the request, API service 132 can execute the one or more subqueries based on provider information included in the schema definition for each node (subquery). As discussed in further detail below, the provider information indicates where a subquery is to be executed, as data may reside in geographically separate locations. For example, data for a list of companies may reside on a server in the United States, while employee data may reside on a server in the United Kingdom, payment information may reside on a server in Australia, and so on. Based on the provider data identified in the schema definition for each node, API service 132 can route each subquery to the appropriate server(s) for processing.

In some cases, API service 132 may route subqueries to the appropriate server(s) for processing sequentially based, for example, on data dependencies for the individual subqueries and a provider for each of the one or more subqueries. For example, using the example described above, assume that a user wishes to obtain information about an employee of a specific company. API service 132 may generate two queries as a result of decomposing the query against the API graph projection: a first query to obtain a unique ID for the specified company, and a second query to obtain information about the specified employee using the unique ID for the specified company. Because the servers on which company data and employee data are not collocated in this example, API service 132 may route the first query to application server 150 in a first server location $140_1$ for execution before routing the second query to application server 150 in a second server location $140_2$ for execution.

After API service 132 routes the subqueries to the appropriate server(s) for processing, API service 132 receives a result set from at least one of the one or more application servers 150. Based on the received result set, API service 132 can generate a parseable response and transmit the response to client device 120 for display in user interface 122. The parseable response may be formatted, for example, as a set of JSON-style key-value pairs including the data requested by a user.

In some cases, API service 132 may include an authentication service to identify a user of client device 120 and determine which portions of an API the user can access. The authentication service may operate, for example, on a per-session basis, where client device 120 provides login credentials to API service 132 to establish a session with API service 132 that is valid for a pre-determined amount of time. In another case, the authentication service may operate using certificates transmitted from a client device 120 and API service 132 that identify the client device 120 and the private APIs (if any) that client device 120 can use. Based on the data provided to the authentication service, API service 132 can generate a graph projection of the API including any extensions usable by the specific client device. If an application executing on client device 120 attempts to use an API extension that is not included in the graph projection (e.g., an API extension that is not available for use by client device 120), API service 132 can generate an error to indicate that the requested API extension is not available for use by client device 120.

API extender 134 generally provides an interface in which software developers can add extensions to an existing API. API extender 134 can receive a definition of an API extension from a software developer as, for example, an uploaded file or text input from a field provided by API extender 134 and displayed in user interface 122. The uploaded file may be, for example, written in a parseable markup language (e.g., YAML, XML, and so on) and define the node from which the extension depends, required and optional data input for the extension, and one or more outputs provided by the extension.

When API extender 134 receives a definition of an API extension from a software developer, API extender 134 can verify that the extension depends from an existing node (including the root node) in a current graph projection of the API. If the extension depends from an existing node, API extender 134 can commit the received file or text input defining API extension to a schema data store (e.g., API schema 172 in schema data store 170). API extender 134 can generate an updated graph projection of the API including the newly-committed extension, and API service 132 can subsequently use the updated graph projection of the API to process requests from a client device 120.

If API extender 134 detects that the extension does not depend from an existing node in the current graph projection of the API, API extender 134 can transmit a message to client device 120 to indicate that the definition provided to API extender 134 contains an error. In some cases, API extender 134 can, based on dependency information included in the definition provided to API extender 134 and the current graph projection of the API, provide a suggested dependency to a user (e.g., if the indicated dependency is a close misspelling of a node in the current graph projection of the API). If a user confirms that the suggested dependency is the correct dependency, API extender 134 can edit the provided definition of the API extension and add the API extension to the API, as discussed above.

Server location 140 may be a geographically distinct location at which data and associated data processing routines may be stored. In a distributed system, different types of data may be stored in different locations to satisfy, for example, data privacy requirements for different countries and so on. Each server location 140 may include an application server 150 and data store 160.

Application server 150 generally includes a request processor 152. Request processor 152 receives a query from API service 132 at application gateway 130 for processing. The query may be, for example, an API call or a database query including one or more parameters provided in the request received at application gateway 130 or obtained from other data sources (e.g., from a separate query executed on a different application server 150). In some cases, application server 150 at first server location 140$_1$ can directly request data from second server location 140$_2$. Application server 150 at first server location 140$_1$ can determine whether or not a direct access to application server 150 at second server location 140$_2$ is allowed based on data included in the API schema definition for services provided by application server 150 at second server location 140$_2$.

Based on the query received from API service 132, request processor 152 can execute a query on user data 162 in data store 160 for the requested data. In some cases, request processor 152 may additionally include other logic for processing the requested data before transmitting the requested data to application gateway 130.

Data store 160 generally is a repository storing data that request processor 152 can access to satisfy requests for data received at application server 150. The requests for data, as discussed above, may be received from API service 132 at application gateway 130 or from another application server 150 in a second server location 140$_2$ if the API schema indicates that application server 150 at first server location 140$_1$ allows for direct querying of data from a different application server. As illustrated, data store 160 generally includes user data 162 in a sortable and searchable state. In response to a query received from request processor 152 at application server 150, data store 160 can return a set of data matching the parameters included in the request, and request processor 152 may perform additional processing on the returned data before providing the data to a client device 120 via API service 132 at application gateway 130.

Schema data store 170 generally is a repository for storing schema definition files for each node, or query, available in an API. As illustrated, schema data store 170 includes API schema files 172. Data stored in API schema files 172 may define one or more functions provided by the API. As developers create API extensions through API extender 134, files defining these API extensions may be committed to API schema files 172. In some cases, schema data store 170 may also store a graph projection of the API, including extensions added to the API by various developers.

Figure 2:
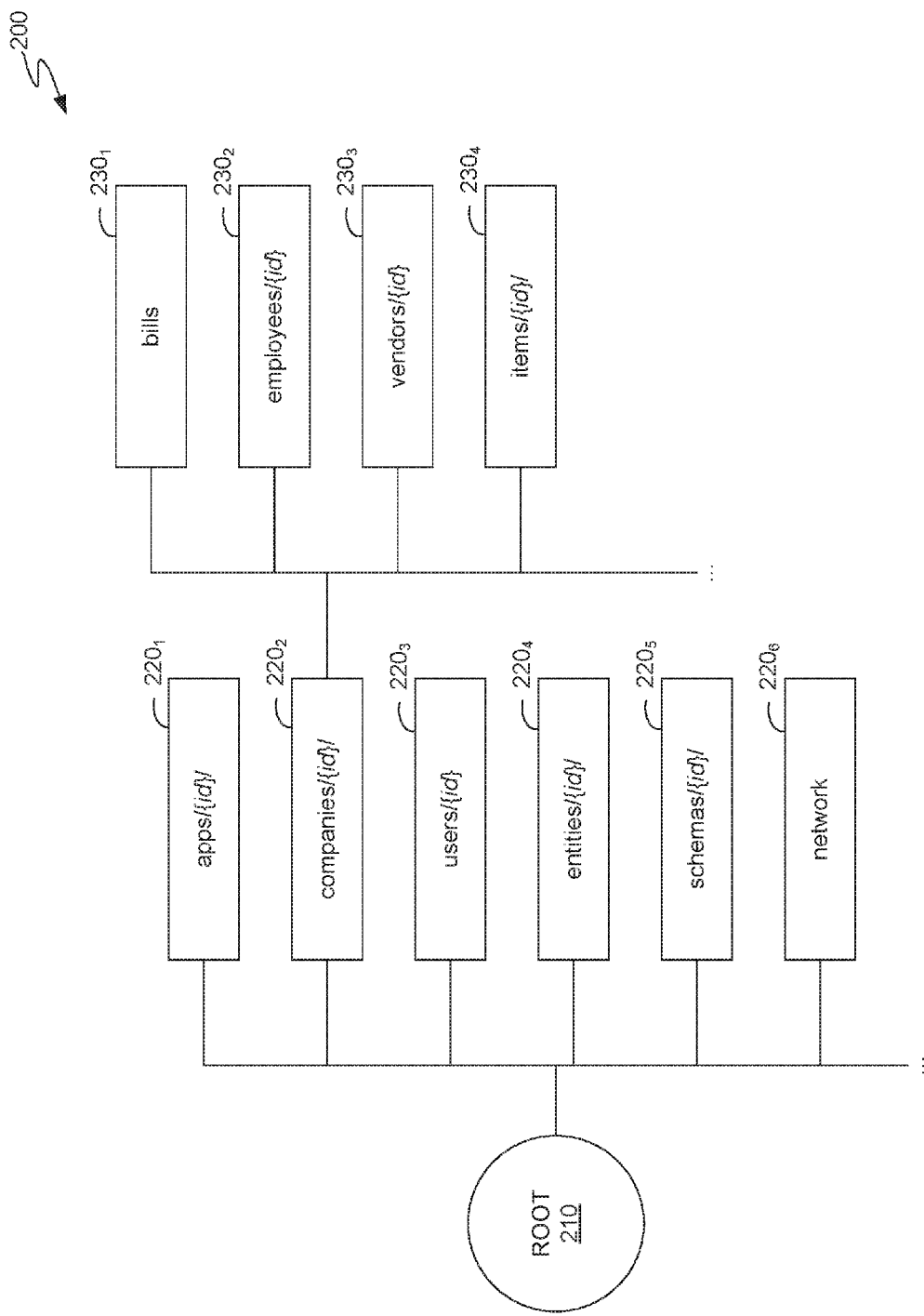
FIG. 2 illustrates an example graph representation of an application programming interface (API), according to one embodiment.

FIG. 2 illustrates an example graph projection 200 of an API, according to an embodiment. As illustrated, graph projection 200 includes a root node 210 which API service 132 uses to begin a traversal of graph projection 200 of the API to determine whether a received request is valid (e.g., is accessible as a continuous path from root node 210) or invalid.

As illustrated, graph projection 200 includes a plurality of first-level nodes 220 immediately accessible from root node 210. Each of the first-level nodes 220 may represent a query for data that API service 132 can execute on one or more application servers 150 at a server location 140. As illustrated, first-level nodes 220$_1$ (apps), 220$_2$ (companies), 220$_3$ (users), 220$_4$ (entities), and 220$_5$ (schemas) indicate that a query for data from each of these nodes requires that the query include an identifier. For example, to obtain data for a specific company (i.e., a query that reaches node 220$_2$ from root node 210), a request transmitted to API service 132 for processing is required to include an identifier associated with a specific company. Further, as illustrated in node $220_6$, queries for network data need not include an identifier as a parameter.

Second-level nodes 230, which are illustrated as child nodes of first-level node $220_2$ (i.e., the companies node), provide data specific to a specific member of a first-level node 220. As illustrated in FIG. 2, second-level nodes 230 provide information about bills payable (node $230_1$), employees (node $230_2$), vendors (node $230_3$), items (node $230_4$), and so on associated with a specific company. Generally, to successfully request data associated with a second-level node 230, a request transmitted to API service 132 should be structured such that the appropriate second-level node 230 is accessible from a first-level node 220 specified in the request. For example, to request employee data from second-level node $230_2$, for example, a request transmitted to API service may be required to include a request for a specified company (i.e., because second-level node $230_2$ is accessible through first-level node $220_2$, the request should generate a path in graph projection 200 of the API from root node 210 to first-level node $220_2$ to second-level node $220_3$).

Graph projection 200 may be generated from one or more schema definitions (e.g., API schema files 172) stored in schema data store 170. As software developers add API extensions to an existing API, API extender 134 can update graph projection 200 to add a node to graph projection 200 representing the API extension as an accessible path from root node 210. In some cases, an API extension may be added to graph projection 200 as a first-level node 220 directly accessible from root node 210; in other cases, where an API extension depends on (or uses) a specific set of data, the API extension may be added to graph projection 200 as an $n^{th}$ level node in graph projection 200. For example, an API extension that uses employee data may be added as a third-level node from second-level node $230_2$ (the employee node illustrated in graph projection 200). To interact with the API extension, a request may be structured to provide a path from root node 210 to first-level node $220_2$ (i.e., the companies node), then to second-level node $230_2$ (the employees node), and finally to the API extension represented by the appropriate third-level node.

FIG. 3 illustrates an example node definition 300 for a data function defined for a graph-based API, according to an embodiment. Generally, node definition 300 can provide information identifying a scope of the node, a data provider for the node, and one or more data properties provided by the node. The scope information included in node definition 300 may be set to allow any application to use a data function defined for the graph-based API (i.e., public scope) or may restrict access to the function to a limited subset of users (e.g., private scope). For example, API extensions developed for a specific organization (e.g., by a third party developer or an organization's internal development team) may be set to a private scope that allows only users within the organization to use the extension.

Provider information defined in node definition 300 generally indicates a server location 140 at which the data used by the node is stored. The provider information may include, for example, an IP address of the one or more application servers 150 that can process the request, a URL of the one or more application servers 150, and so on. In some cases, provider information defined in node definition 300 may additionally indicate read/write permissions for data associated with the node and whether the application servers 150 identified as the provider for the node can be accessed directly from other application servers 150 in different server locations 140.

As illustrated, node definition 300 includes data identifying a plurality of properties associated with the node. The properties associated with the node generally include data that a user can request from the node. As illustrated, the node definition for "employee data" includes at least four properties: "id," "hireDate," "releaseDate," and "contractDetails." Each property may be associated with a type, a data format, and a description. As illustrated, "id," "hireDate," and "releaseDate" are defined in node definition 300 as primitives, while "contractDetails" is defined as an array including multiple entries from the "EmployeeContractDetails" node. Based on the information included in node definition 300, API service 132 can generate a graph projection of the API including an access path to each of the employee data properties defined in node definition 300.

Figures 4, 5:
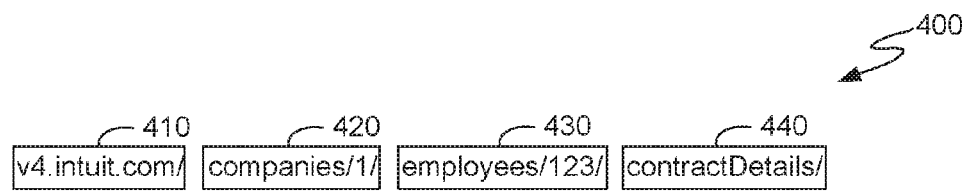
FIG. 4 illustrates an example RESTful request for data from a remote source using a graph-based API, according to one embodiment.
FIG. 5 illustrates an example graph query for data from a remote source using a graph-based API, according to one embodiment.

FIG. 4 illustrates a decomposed RESTful request 400 for data using a graph projection of an API, according to an embodiment. As illustrated, request 400 can be decomposed into a first part 410, second part 420, third part 430, and fourth part 440. Request 400 is formatted as a uniform resource locator (URL) including a domain name and a logical path separated by the forward slash indicator.

First part 410 may be defined as the portion of request 400 including data identifying the root node of the graph projection of the API, which, as discussed above, may function in a similar fashion to a protocol binding that allows API service 132 to decompose request 400 and identify the data sources to interact with to satisfy request 400. As illustrated, the root node in a RESTful request 400 may be represented as a domain name (or sub-domain) pointing, for example, to an application gateway that receives request 400 for decomposition into multiple subqueries and routing of the subqueries to one or more application servers 150 at one or more server locations 140, as discussed above. If the domain identified in first part 410 cannot be found, user interface 122 may display an error message indicating that the request is invalid.

Second part 420 represents a first subquery that API service 132 at application gateway can route for execution on an application server 150. As illustrated, second part 420 represents a request for data from the companies node $220_2$ in graph projection 200 of the API. Second part 420 additionally includes a numerical identifier (e.g., the value "1") that identifies the company for which a user is requesting data. As companies node $220_1$ requires that an ID be provided in a valid query, API service 132 can generate an error and discontinue processing request 400 if second part 420 did not include a value for the ID parameter (e.g., if the query had been written as "companies/employees/ . . . "). Upon routing a valid second part 420 to the appropriate application server 150 identified in the API schema for companies node $220_2$, API service 132 can receive a key or other data that identifies the company and can be used to generate further subqueries for data related to the identified company.

Third part 430 represents a second subquery that depends on the result provided by the first subquery. As illustrated, third part 430 represents a request for a specific employee of the company queried in second part 420. As employees node $230_2$ requires that an ID be provided in a valid query, API service 132 can check third part 430 to determine whether or not an ID is provided in third part 430 (and consequently whether third part 430 represents a valid query). Upon determining that third part 430 is a valid query, API service 132 routes the query to the appropriate application server 150 identified in the API schema for employees node 230₂ to obtain information for the specified employee.

Fourth part 440 represents a specific data set that a user wishes to obtain from API service 132. As illustrated, fourth part 440 is a request for contract details related to the employee identified in third part 430. In this case, an ID is optional and not provided in fourth part 440. Because an ID is not provided in fourth part 440, API service 132 can generate a query for all of the contract details associated with the identified employee and provide the result set of one or more contract details to a client device 120 via application gateway 130.

FIG. 5 illustrates an example request 500 for data using a graph projection of an API, according to an embodiment. As illustrated, request 500 may be transmitted to API service 132 in a JSON-like format (e.g., as a GraphQL request) for processing and parsing. In request 500, subqueries may be represented in different levels of tab indentation in the request. For example, the companies subquery is represented as a first level of tab indentation and includes a parameter in a JSON-like key-value pairing. As illustrated, the parameter provided in request 500 for the companies subquery is an identifier of the company. API service can generate the companies subquery from data in the first indentation level in request 500, route the companies subquery to the appropriate application server 150 defined for companies node 220₂ in graph projection 200 of the API. In response, API service 132 receives a key or other data that identifies the company.

The employees subquery is represented as a second level of tab indentation in request 500, which indicates that the employees subquery depends on data returned from execution of the first subquery (e.g., depends on an identifier of a specific company for which employee data is to be queried). As illustrated, the employees subquery also includes a parameter in a JSON-like key-value pairing. API service 132 can generate the employees subquery from the company identifier returned for the companies subquery and the employee ID provided in the second level of tab indentation in request 500. Based on the data set returned from executing the employees subquery, API service 132 can generate a final subquery to request contract details for the employee identified in the employees subquery. API service 132 may transmit the results of the final subquery to client device 120 for display in user interface 122.

Figure 6:
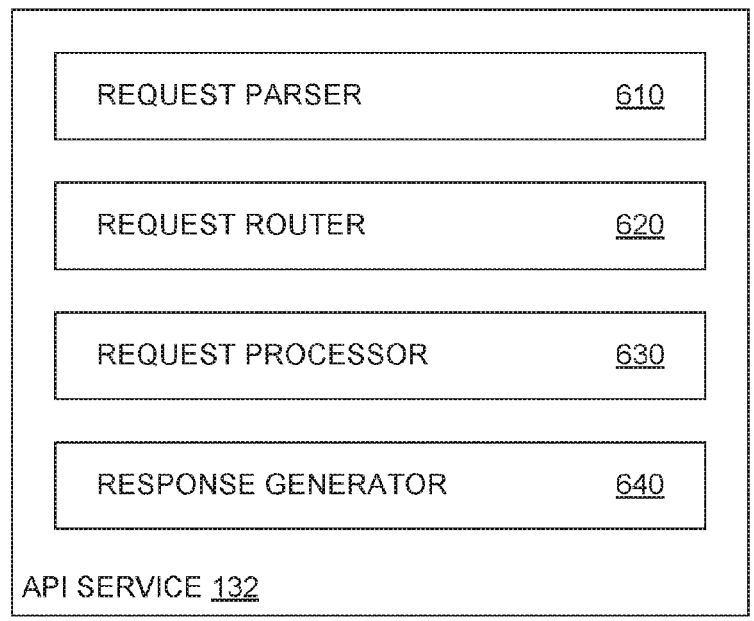
FIG. 6 illustrates a block diagram of an example API service, according to one embodiment.

FIG. 6 illustrates an example block diagram of an API service 132, according to an embodiment. As illustrated, API service 132 includes a request parser 610, a request router 620, a request processor 630, and a response generator 640.

Request parser 610 is generally configured to receive a request for data from client device 120 and decompose the request into one or more subqueries. To decompose the request into one or more subqueries, request parser 610 can include a defined set of delimiters or other rules for processing the request. For example, if API service 132 receives requests in a RESTful format (e.g., in the format illustrated by request 400), API service 132 can use the forward slash character (i.e., "/") to decompose the request into one or more subqueries. In some cases, if API service 132 allows requests to include parameters using HTTP parameter conventions, request parser 610 can additionally use the question mark and ampersand characters as delimiters to separate an identification of the node (or subquery) from the parameters provided for the subquery.

In another example, request parser 610 can decompose a request for data from client device 120 into one or more subqueries based on levels of indentation in the request. Each level of indentation may represent a different subquery that depends on a previous subquery. To extract parameters from a request, request parser 610 can search for parameters in each level of indentation by searching for key-value pairs between a defined set of characters (e.g., the opening and closing braces ("{" and "}"), opening and closing parentheses ("(" and ")"), and so on). If a subquery can include multiple parameters, each parameter may be separated by a defined character, such as the semicolon character (";").

After request parser 610 decomposes a received request for data into one or more subqueries, request parser 610 determines whether the request is a valid request. To determine if a received request for data is a valid request, request parser 610 can examine each subquery against a schema definition for the subquery. If the schema definition indicates that a number of parameters are required for the subquery to execute and the request does not include the required number of parameters, request parser 610 can determine that the request is invalid and generate an error message to indicate that the required number of parameters for a specific subquery were not provided in the request.

Request parser 610 can also traverse a graph projection 200 of the API to determine that each subquery generated from the received request is accessible in the graph projection 200 of the API. Errors in request may result, for example, from misspelling of node names (resulting in a subquery that is not in the graph projection 200 of the API) or from skipping levels of nodes in graph projection 200 of the API. If request parser 610 determines that the request includes one or more subqueries that are not accessible in a traversal of graph projection 200 of the API, request parser can generate an error message to indicate that the request is invalid.

Upon determining that a request is a valid request (e.g., includes an accessible path through graph projection 200 of the API and any required parameters for each node identified in the path), request parser 610 can provide the one or more subqueries to request router 620 for processing at the appropriate application server 150. To route a subquery to the appropriate application server 150 for processing, request router 620 can examine provider information included in the schema definition for the node representing the subquery. The provider information generally includes an address (e.g. URL) of the server that can process requests for data related to the node in graph projection 200 of the API.

In some cases, where a second subquery depends on data returned by a first subquery, request router 620 can provide subqueries in a sequential fashion. Using the request illustrated in FIG. 4 as an example, request router 620 can route a first subquery generated from second part 420 to an application server 150 identified in the schema definition for the node associated with the first subquery. Upon receiving a valid response (e.g., non-null data) to the first subquery, request router 620 can generate a second subquery based on the response to the first subquery and the data in third part 430 of the request. Request router 620 subsequently can provide the second subquery to an application server 150 identified in the schema definition for the node associated with the second subquery.

In some cases, the provider information for a node in graph projection 200 of the API indicates that a subquery related to the node can be processed at application gateway 130. If a subquery can be processed at application gateway 130, request router 620 can provide the subquery to request processor 630 for processing. Request processor 630 is generally configured to receive a subquery and generate a result set from data stored in an associated data store. In some cases, where the associated data store is a relational database, request processor 630 may be configured to generate and process a Structured Query Language (SQL) query on the relational database and return the results of the SQL query as a data set, or array, to request router 620. In some cases, the associated data store may be a non-relational database, a series of flat files, and so on, and request processor 630 may return the results of the query as serialized, parseable data.

Response generator 640 is generally configured to cache the responses generated for each subquery defined by request parser 610 until API service 132 completes processing the request. When API service 132 receives a data set for the last subquery identified by request parser 610, response generator 640 can generate a response to be transmitted to the requesting client device 120. API service 132 may generate the response, for example, as serialized data, such as XML data or a JSON-formatted response, that client device 120 can parse to extract the data set for the last subquery.

Figure 7:
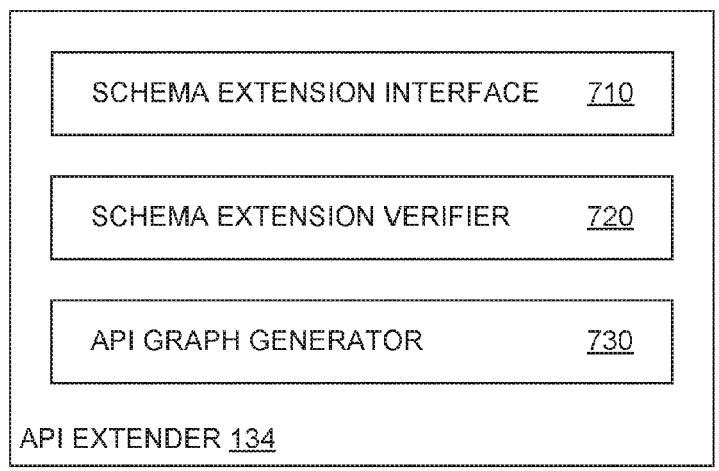
FIG. 7 illustrates a block diagram of an example API extender, according to one embodiment.

FIG. 7 illustrates a block diagram of an example API extender 134, according to an embodiment. As illustrated, API extender 134 includes a schema extension interface 710, schema extension verifier 720, and API graph generator 730.

Schema extension interface 710 generally provides an interface for users of a client device 120 to provide schema definitions to be verified and added to the API. In some cases, schema extension interface 710 may be a webpage that provides a text field in which a developer can write a schema definition for an extension to the API. In some cases, schema extension interface 710 may alternatively or additionally provide a file upload interface that developers can use to upload schema definition files to API extender 134 to be verified and added to the API.

Upon receiving a schema definition at schema extension interface 710, API extender 134 provides the received schema definition to schema extension verifier 720 to determine if the received schema definition can be added to the API. To determine whether a schema definition is valid, schema extension verifier can examine data in the schema definition that identifies a parent node in the graph projection of the API for the API extension. In some cases, the parent node may be the root node 210 of the graph projection 200 of the API; in other cases, the parent node may be an $n^{th}$ level node in the graph projection 200 of the API. A valid schema definition may be defined as a child node of an existing node in graph projection 200 of the API. If the schema definition defines the parent node of the API extension as a node that does not exist in the graph projection 200 of the API, schema extension verifier 720 can generate an error indicating that the schema definition is invalid. Otherwise, schema extension verifier 720 can commit the received schema definition to schema data store 170 and request that API graph generator 730 generate an updated graph projection of the API.

API graph generator 730 is generally configured to scan API schema files 172 in schema data store 170 to generate a graph projection of the API. When schema extension verifier commits a schema definition for an API extension to schema data store 170, API graph generator 730 can generate an updated graph projection of the API by adding a node to the existing graph projection 200 of the API representing the API extension. The node representing the API extension may include information linking the node to the parent node identified in the schema definition.

After API graph generator 730 updates the graph projection of the API, API graph generator 730 can commit the graph projection of the API (including the API extension received at schema extension interface 710) to schema data store 170. In some cases, API graph generator 730 can additionally or alternatively save a local copy of the graph projection of the API at application gateway 130 to be used in processing requests from a client device 120.

Figure 8:
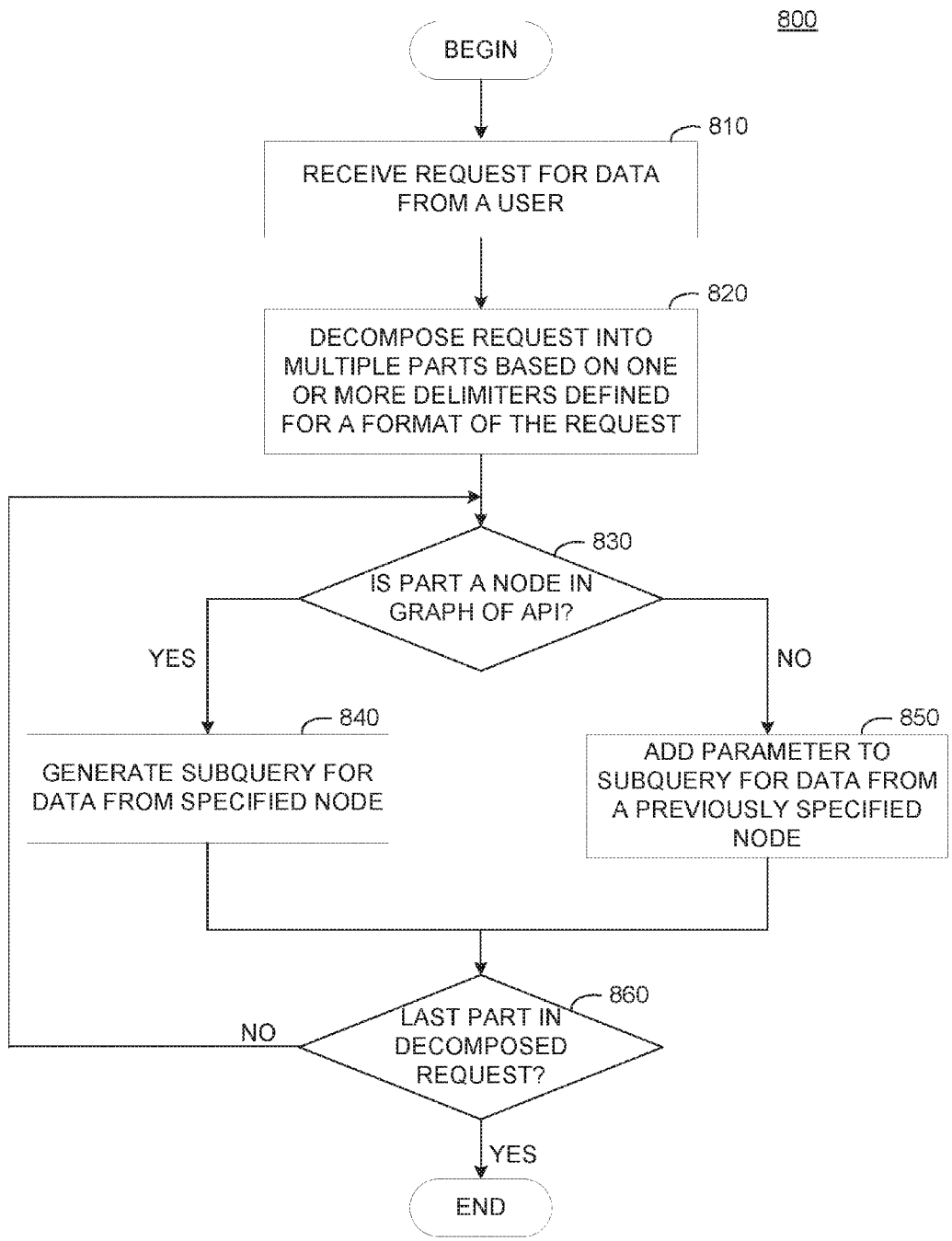
FIG. 8 illustrates example operations for decomposing a request for data using a graph-based API into a plurality of subqueries, according to one embodiment.

FIG. 8 illustrates a method 800 that may be performed by API service 132 to decompose a request for data received at API service 132 into subqueries, according to one embodiment.

As illustrated, method 800 begins at step 810, where API service 132 receives a request for data from a user. API service 132 may receive the request, for example, in a RESTful format, in a JSON-like format (e.g., a GraphQL query), or another parseable data format.

At step 820, API service 132 decomposes the request into multiple parts based on whatever delimiters are present in the request. For example, if API service 132 receives the request in a RESTful format, API service 132 can decompose the request into multiple parts based on the forward slash character. In another example, if API service 132 receives the request in a tab-sensitive format (e.g., a GraphQL query), API service 132 can decompose the request into multiple parts based on the level of indentation for each of the parts in the request.

At step 830, API service 132 can step through each part of the request to determine whether the part corresponds to a node in the graph projection of the API. API service 132 can determine if the part is node in the graph projection of the API, for example, by comparing the text content of the part to node descriptions in the graph projection of the API. If the part is a node in the graph projection of the API, at step 840, API service 132 generates a subquery for data from the specified node.

If the part is not a node in the graph projection of the API, API service 132 can determine that the part is a parameter for a subquery generated previously at step 840. At step 850, API service 132 adds the parameter to the subquery for data from a previously specified node. For example, using the example described above in FIG. 4, the numerical values provided after an indication of a node are not nodes in the graph projection of the API. In parsing "companies/1/," API service 132 can generate a subquery for data about a particular company at step 840 and add a parameter to the subquery at step 850 to identify the specific company to obtain from a data source.

At step 860, API service 132 determines if the part is the last part in the decomposed request. If the part is the last part in the decomposed request, operations 800 end. Otherwise, operations 800 return to step 830 to determine whether the next part of the decomposed request is a node in the graph projection of the API or a parameter for a previously identified node in the graph projection of the API.

Figure 9:
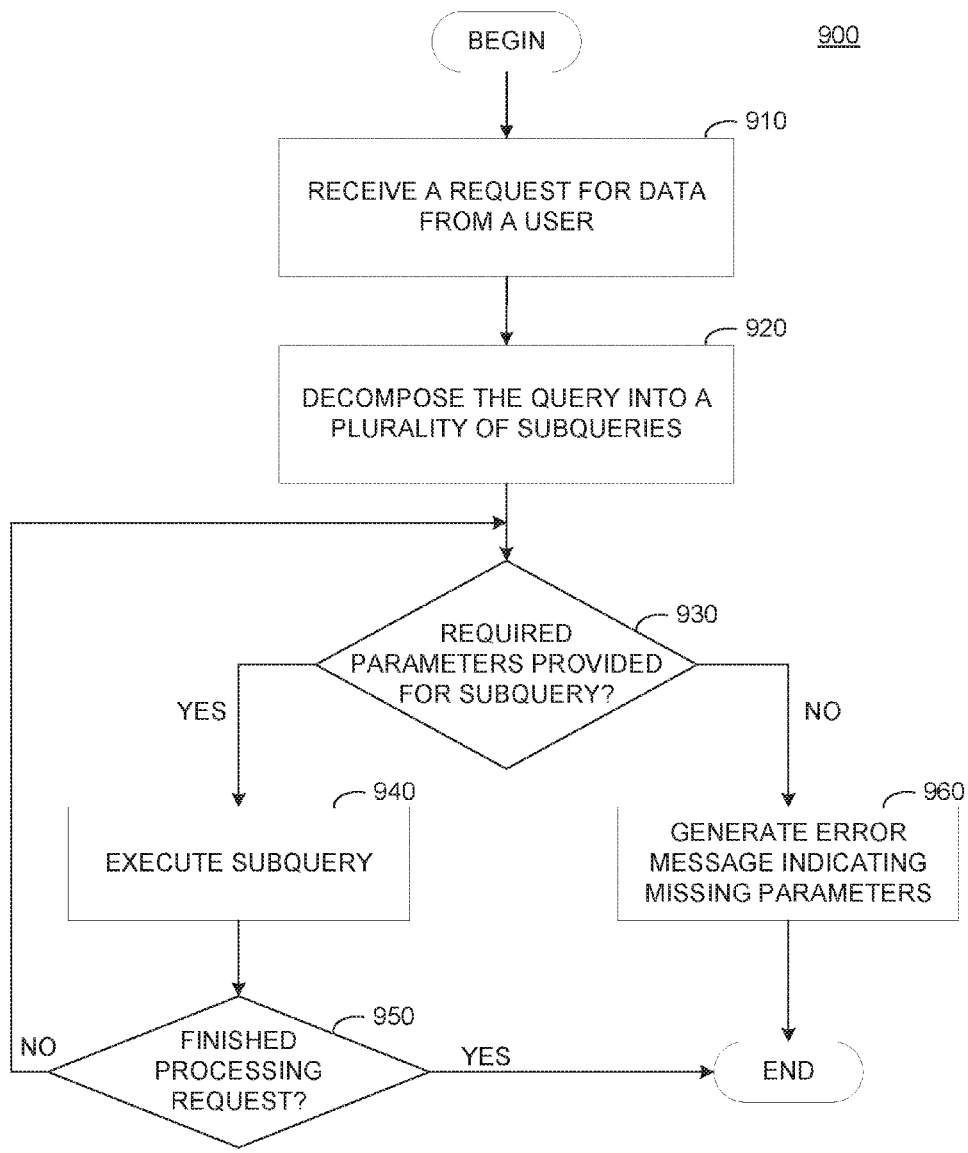
FIG. 9 illustrates example operations for processing a request for data using a graph-based API, according to one embodiment.

FIG. 9 illustrates a method 900 that may be performed by an API service 132 for processing a request for data using a graph projection of an API, according to an embodiment. As illustrated, the method 900 begins at step 910, where API service receives a request for data from a user.

At step 920, API service 132 decomposes the request into a plurality of subqueries. As discussed above, API service 132 can decompose the request into a plurality of subqueries based on one or more delimiters defined for the format of the request (e.g., forward slashes for RESTful requests, indentation levels for JSON-like requests, and so on).

At step 930, API service 132 determines whether the subquery includes any parameters required to execute the subquery. API service 132 can examine the schema definition for a particular subquery to obtain a list of required and optional parameters for a subquery (if any). For example, because a subquery generally identifies a node in the graph projection of the API that a user wishes to interact with, API service 132 can examine the schema definition associated with the node and obtain a list of mandatory and optional parameters defined for queries generated for the node. API service 132 examines the parameters included in the subquery to determine whether each required parameter is present. If the subquery includes the required parameters (e.g., includes the correct number of parameters and the correct types of parameters), at step 940, API service 132 executes the generated subquery. In executing the generated subquery, API service 132 can examine the schema definition for the node in graph projection 200 of the API associated with the generated subquery to determine an address of the provider (e.g., a specific application server 150) that is the designated processor for the subquery. If the provider indicated in the schema definition is application gateway 130, API service 132 can execute the subquery locally and cache the result returned by the subquery for use in generating additional subqueries. Otherwise, API service 132 can transmit the subquery to the identified application server 150 for processing, receive a data set in response to the subquery, and cache the data set.

At step 950, API service 132 determines whether or not API service 132 has finished processing the request. If API service 132 has finished processing the request, API service 132 can provide a result set to the user, and operations 900 end. Otherwise, operations 900 return to step 930, where API service 132 determines if the required parameters have been included in the request for the next subquery.

If, however, API service 132 determines that the required parameters are not provided for the subquery, at step 960, API service 132 can generate an error message to be displayed in user interface 122 at client device 120. The error message may indicate that a request is invalid and the parameters that would be required for the request to be valid.

Figure 10:
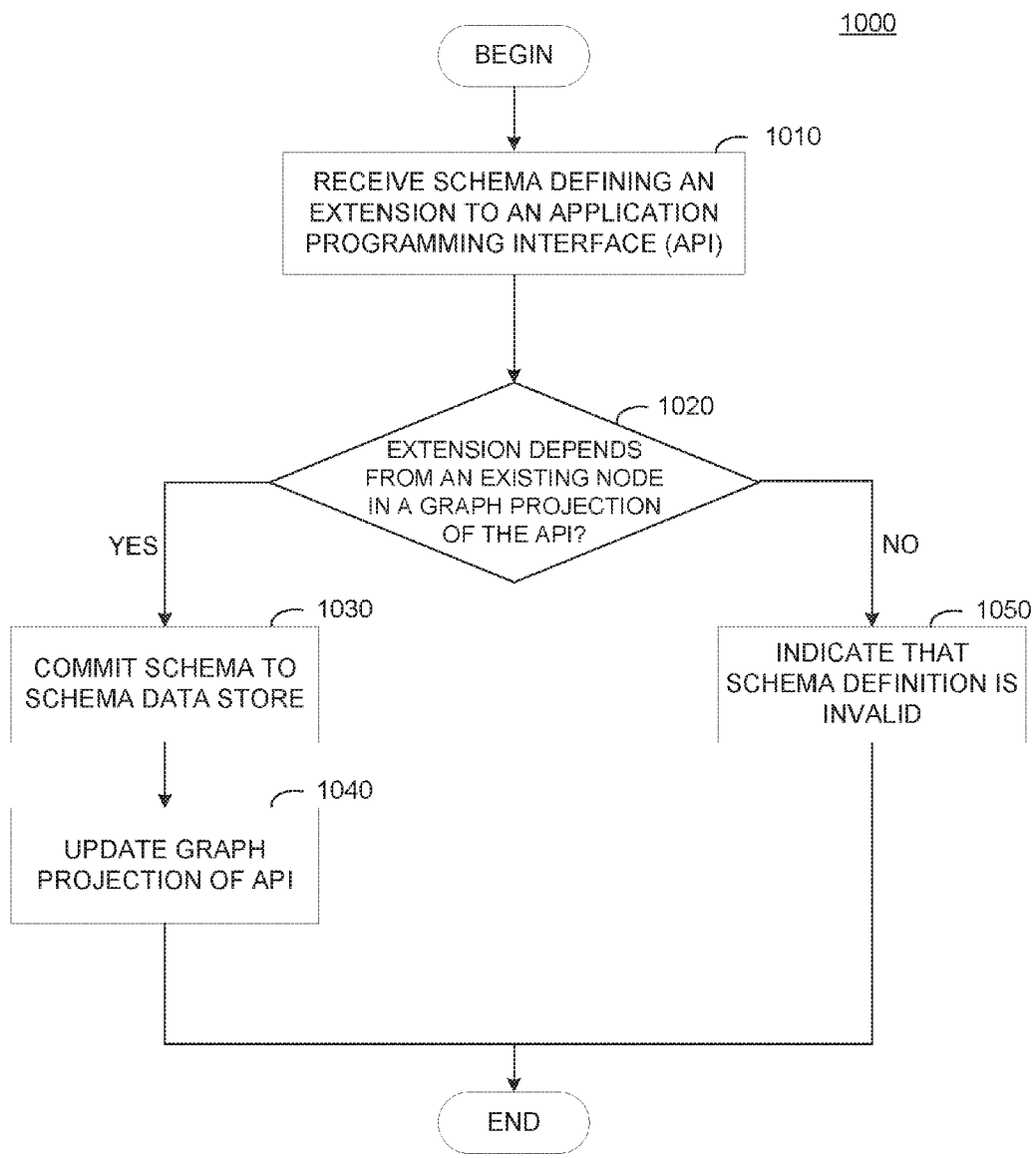
FIG. 10 illustrates example operations for verifying and adding an extension to a graph-based API, according to one embodiment.

FIG. 10 illustrates a method 1000 to verify and add an extension to an existing graph-based API, according to an embodiment. The method 1000 may be performed by API extender 134. As illustrated, method 1000 begins at step 1010, where API extender 134 receives a schema defining an extension to an API. The schema may be, for example, text input in a webpage provided by API extender 134 or a file uploaded through API extender 134. The schema may include information about the parent node for the extension, accessibility (e.g., whether the extension is public or private), data provided by the extension, and so on.

At step 1020, API extender 134 verifies that the extension depends from an existing node in a graph projection of the API. If the extension depends from an existing node in a graph projection of the API (i.e., a traversal of the graph projection of the API would result in a continuous path to a node representing the extension), at step 1030, API extender commits the schema to a schema data store (e.g., API schema files 172 in schema data store 170). At step 1040, API extender 134 updates the graph projection of the API to include a node representing the API extension and a connection between the node representing the API extension and the identified parent node. API extender 134 can save a local copy of the updated graph projection at application gateway 130 and commit a copy of the updated graph projection to schema data store 170, and client devices 120 can invoke the functionality exposed by the extension.

If, however, the extension does not depend from an existing node in the graph projection of the API, at step 1050, API extender 134 can generate an error message to indicate that the schema definition is invalid. In some cases, API extender 134 can additionally provide suggestions about the node from which the extension may depend (e.g., if the schema definition provided at step 1010 includes a misspelled parent node reference that is close to the name of an actual node.

Figure 11:
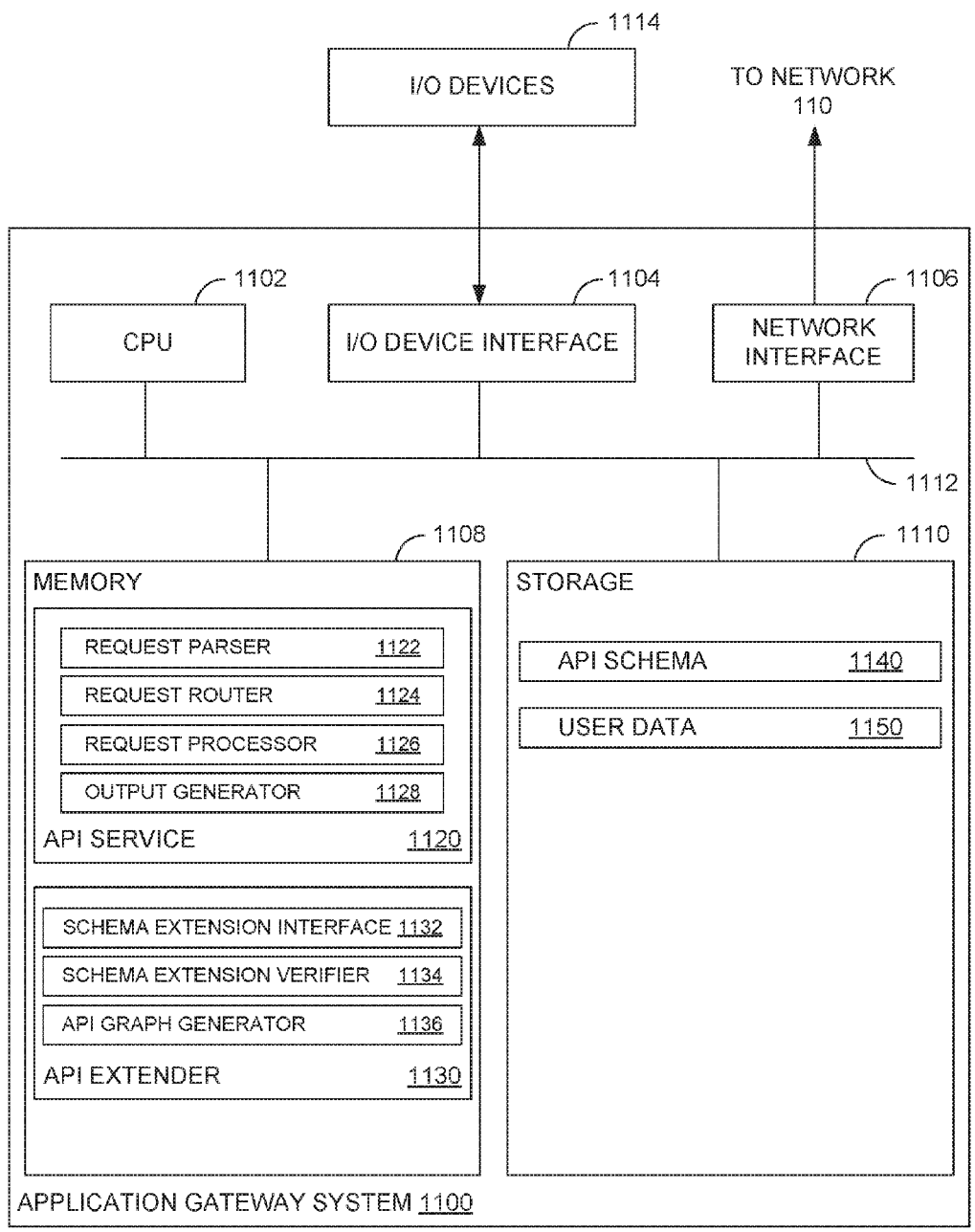
FIG. 11 illustrates an example computing system for exposing a graph-based API to client devices and processing requests for data using a graph-based API, according to one embodiment.

FIG. 11 illustrates an example application gateway system for processing requests using a graph-based API and extending the API, according to an embodiment. As shown, the system 1100 includes, without limitation, a central processing unit (CPU) 1102, one or more I/O device interfaces 1104 which may allow for the connection of various I/O devices 1114 (e.g., keyboards, displays, mouse devices, pen input, etc.) to the system 1100, network interface 1106, a memory 1108, storage 1110, and an interconnect 1112.

CPU 1102 may retrieve and execute programming instructions stored in the memory 1108. Similarly, the CPU 1102 may retrieve and store application data residing in the memory 1108. The interconnect 1112 transmits programming instructions and application data, among the CPU 1102, I/O device interface 1104, network interface 1106, memory 1108, and storage 1110. CPU 1102 is included to be representative of a single CPU, multiple CPUs, a single CPU having multiple processing cores, and the like. Additionally, the memory 1108 is included to be representative of a random access memory. Furthermore, the storage 1110 may be a disk drive, solid state drive, or a collection of storage devices distributed across multiple storage systems. Although shown as a single unit, the storage 1110 may be a combination of fixed and/or removable storage devices, such as fixed disc drives, removable memory cards or optical storage, network attached storage (NAS), or a storage area-network (SAN).

As shown, memory 1108 includes an API service 1120 and an API extender 1130. API service 1120 generally receives a request for data from a client device 120, parses the request into one or more subqueries, and provides data to the client device 120 in response to the request. As illustrated, API service 1120 generally includes a request parser 1122, request router 1124, request processor 1126, and an output generator 1128.

Request parser 1122 is generally configured to decompose a received request into multiple parts based on a set of delimiters defined for a format of the request (e.g., the forward slash character for RESTful requests, levels of indentation for JSON-like requests, and so on). After decomposing a received request into multiple parts, request parser 1122 can generate one or more subqueries from the parts and determine whether or not the generated queries constitute valid queries. As discussed above, a valid query generally includes parameters that are defined in an associated schema as required parameters for the query and generally can be located in a graph projection of the API using a continual path through the graph projection.

If request parser 1122 determines that a subquery is valid, request parser 1122 can provide the subquery to request router 1124 to be routed to the appropriate system for processing. Request router 1124 can examine the schema definition for the node associated with the subquery. Based on provider information in the schema definition, request router 1124 can route the subquery to the appropriate system for processing. If the provider information in the schema definition indicates that the subquery is to be processed at application gateway 1100, request router 1124 can provide the subquery to request processor 1126 for processing. Otherwise, request router 1124 can transmit the subquery to the identified application server 150 via network interface 1106.

Request processor 1126 is generally configured to receive subqueries from request router 1124 for processing. To process a request, request processor 1126 can examine data located in storage 1110 (e.g., user data 1150) or at a remote location for data matching the parameters included in a subquery, if any, received from request router 1124. In response to the query, request processor 1126 can generate a result set including the requested data (or a null data set, if no data matches the parameters included in the subquery) and transmit the result set to output generator 1128 for caching and/or output to a client device 120.

Output generator 1128 is generally configured to receive data in response to one or more subqueries routed to an application server 150 by request router 1124. Output generator 1128 can cache the results of a subquery for use by request parser 1122 in generating subsequent queries. When request router 1124 routes the last subquery in the request to the appropriate application server 150 identified in the schema definition for a node corresponding to the subquery, output generator 1128 receives a data set to be returned to the requesting client device 120. In some cases, output generator 1128 can serialize the data set received from application server 150 into a parseable data format for display in user interface 122 on the requesting client device 120.

As illustrated, API extender 1130 includes schema extension interface 1132, schema extension verifier 1134, and API graph generator 1136. Schema extension interface 1132 generally provides one or more interfaces that a developer can use to upload a schema defining an API extension to be added to an existing graph-based API. In some cases, schema extension interface 1132 can expose a free-form text entry field that a developer can use to submit a schema definition; additionally or alternatively, schema extension interface 1132 can include a file upload interface that allows a developer to upload a pre-written schema file defining an API extension.

After a developer provides a schema defining an API extension to be added to an existing graph-based API via schema extension interface 1132, schema extension verifier 1134 generally examines the schema to determine if the schema is a valid definition of an API extension. A schema may be a valid definition of an API extension, for example, if the schema defines the extension's parent node to be an existing node in the graph projection of the API. By defining an extension's parent node as an existing node in the graph projection of the API, API service 1120 can locate the extension using a single, continuous traversal of the graph projection of the API. If schema extension verifier 1134 determines that the schema is valid, schema extension verifier 1134 can commit the schema to a schema data store (e.g., API schema 1140 in storage 1110). Otherwise, schema extension verifier 1134 can generate an error to indicate to a developer that the schema definition is invalid and was not committed to the schema storage repository.

API graph generator 1136 is generally configured to update a graph projection of the API when schema extension verifier 1134 determines that a schema definition is valid and commits the schema definition to a schema data store. The updated graph generally includes a new node representing the API extension, and the node generally includes data indicating the parent node of the extension.

As shown, storage 1110 includes API schema 1140 and user data 1150. API schema 1140 generally provides a data store that includes schema definition files for each of the nodes in a graph projection of the API. As developers add extensions to the API, additional schema definition files may be committed to API schema 1140. In some cases, API schema 1140 can additionally store a graph projection of the API, which may be updated over time as developers add extensions to the API.

User data 1150 generally includes data that application gateway system stores for an application and can provide in response to a query received at request processor 1126. User data 1150 may be maintained, for example, in a relational database, and request processor 1126 can execute database queries on user data 1150 based on the parameters included in a subquery. In some cases, user data 1150 may be maintained in a non-relational data store, and request processor can generate queries for user data 1150 based on, for example, key-value pairs or other data points.

Advantageously, deploying APIs using object schemas allows a system to project a graph representation of an API to use in generating API calls. Using the projected graph representation, a system can interpret API calls as a path through the graph, which may allow for generation of API calls without manually generating APIs for each variation of a function that can be invoked in a system. Further, by deploying APIs using object schemas, a system generally allows for dynamic extension of the API by adding new object schemas to an existing group of object schemas. The new object schemas may be defined in relation to an existing node in a graph representation of the API, and a system can allow for interaction with API extensions by building as path through an updated graph representation of the API.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for extending an object schema-based application programming interface (API), comprising:
   receiving, from a user, a schema defining an extension to the API and a reference to a parent node in a graph projection of the API, wherein the graph projection of the API comprises a number of navigable paths, each navigable path representing a function exposed by the API and wherein the extension defines a plurality of functions to be added to the API;
   verifying that the schema defines a valid extension to the API based at least in part on whether the navigable path comprises a continuous path in the graph projection of the API from a root node of the graph projection of the API to the node representing the extension by determining that a parent node of the extension is an existing node in the graph projection of the API;
   updating the graph projection of the API to include a node representing the extension and a navigable path to the node representing the extension; and
   processing a request from the user by traversing through the updated graph projection of the API, the request representing the navigable path to the node representing the extension.

2. The method of claim 1, wherein the schema comprises a parseable markup file.

3. The method of claim 1, wherein the schema includes a resource locator indicating an address of one or more servers hosting the extension to the API.

4. The method of claim 1, wherein the schema includes an indication that a predefined group of users is allowed to interact with the extension.

5. The method of claim 4, wherein the schema further includes information defining authentication procedures to allow the predefined group of users to interact with the extension.

6. The method of claim 1, wherein updating the graph projection of the API to include the extension comprises generating a node associated with the extension and setting the node to depend from a parent node identified in the definition.

7. A system, comprising:
   a processor; and
   a memory comprising instructions which, when executed by the processor, performs an operation for extending an object schema-based application programming interface (API), the operation comprising:
      receiving, from a user, a schema defining an extension to the API and a reference to a parent node in a graph projection of the API, wherein the graph projection of the API comprises a number of navigable paths, each navigable path representing a function exposed by the API and wherein the extension defines a plurality of functions to be added to the API;
      verifying that the schema defines a valid extension to the API based at least in part on whether the navigable path comprises a continuous path exists in the graph projection of the API from a root node of the graph projection of the API to the node representing the extension by determining that a parent node of the extension is an existing node in the graph projection of the API;
      updating the graph projection of the API to include a node representing the extension and a navigable path to the node representing the extension; and
      processing a request from the user by traversing through the updated graph projection of the API, the request representing the navigable path to the node representing the extension.

8. The system of claim 7, wherein the schema includes a resource locator indicating an address of one or more servers hosting the extension to the API.

9. The system of claim 7, wherein the schema includes an indication that a predefined group of users is allowed to interact with the extension.

10. The system of claim 9, wherein the schema further includes information defining authentication procedures to allow the predefined group of users to interact with the extension.

11. The system of claim 7, wherein updating the graph projection of the API to include the extension comprises generating a node associated with the extension and setting the node to depend from a parent node identified in the definition.

12. A non-transitory computer-readable medium comprising instruction which, when executed on a processor, performs an operation for extending an object schema-based application programming interface (API), the operation comprising:
   receiving, from a user, a schema defining an extension to the API and a reference to a parent node in a graph projection of the API, wherein the graph projection of the API comprises a number of navigable paths, each navigable path representing a function exposed by the API and wherein the extension defines a plurality of functions to be added to the API;
   verifying that the schema defines a valid extension to the API based at least in part on whether the navigable path comprises a continuous path exists in the graph projection of the API from a root node of the graph projection of the API to the node representing the extension by determining that a parent node of the extension is an existing node in the graph projection of the API;

updating the graph projection of the API to include a node representing the extension and a navigable path to the node representing the extension; and processing a request from the user by traversing through the updated graph projection of the API, the request representing the navigable path to the node representing the extension.

13. The non-transitory computer-readable medium of claim 12, wherein the schema includes a resource locator indicating an address of one or more servers hosting the extension to the API.

14. The non-transitory computer-readable medium of claim 12, wherein the schema includes an indication that a predefined group of users is allowed to interact with the extension.

15. The non-transitory computer-readable medium of claim 14, wherein the schema further includes information defining authentication procedures to allow the predefined group of users to interact with the extension.

16. The non-transitory computer-readable medium of claim 12, wherein updating the graph projection of the API to include the extension comprises generating a node associated with the extension and setting the node to depend from a parent node identified in the definition.

\* \* \* \* \*